US010463978B2

(12) United States Patent
Tran et al.

(10) Patent No.: US 10,463,978 B2
(45) Date of Patent: Nov. 5, 2019

(54) REFRESHABLE BRAILLE DISPLAY ACCESSORY FOR A GAME CONTROLLER

(71) Applicant: Microsoft Technology Licensing, LLC, Redmond, WA (US)

(72) Inventors: Jessica Julie Tran, Renton, WA (US); Patrick Thomas Gaule, Bothell, WA (US); John Richard Porter, III, Lynnwood, WA (US); Catherine Marie Baker, Seattle, WA (US); Dillon Taylor Baker, Seattle, WA (US); Brannon James Zahand, Issaquah, WA (US); Harrison Tu, Riverside, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 407 days.

(21) Appl. No.: 15/445,771

(22) Filed: Feb. 28, 2017

(65) Prior Publication Data
US 2018/0214779 A1    Aug. 2, 2018

Related U.S. Application Data

(60) Provisional application No. 62/453,325, filed on Feb. 1, 2017.

(51) Int. Cl.
*A63F 13/00*    (2014.01)
*A63F 13/98*    (2014.01)
(Continued)

(52) U.S. Cl.
CPC .............. *A63F 13/98* (2014.09); *A63F 13/25* (2014.09); *A63F 13/85* (2014.09); *G06F 3/016* (2013.01);
(Continued)

(58) Field of Classification Search
None
See application file for complete search history.

(56) References Cited

U.S. PATENT DOCUMENTS 5,466,154 A    11/1995    Thompson
5,522,728 A    6/1996    Kaplan
(Continued)

FOREIGN PATENT DOCUMENTS

JP    H07163614 A    6/1995
JP    2006247024 A    9/2006
(Continued)

OTHER PUBLICATIONS

Karastoyanov, et al., "Development of a Braille Tactile Device Driven by Linear Magnet Actuators", In International Journal of Engineering and Innovative Technology, vol. 4, Issue 2, Aug. 2014, pp. 35-43.

(Continued)

*Primary Examiner* — Paul A D'Agostino
(74) *Attorney, Agent, or Firm* — Alleman Hall Creasman & Tuttle LLP

(57) ABSTRACT

The present disclosure describes a refreshable braille display accessory for a game controller that includes a housing sized to be received by a handheld game controller, a braille display including a plurality of pins arranged in a plurality of braille cells, each of the plurality of braille cells to provide tactile feedback representative of individual braille characters, and a control circuit enclosed within the housing to control refreshable activation of at least a portion of the plurality of pins based at least in part on a translation of game text or game audio.

20 Claims, 8 Drawing Sheets

(51) Int. Cl.
  *G09B 21/00* (2006.01)
  *A63F 13/25* (2014.01)
  *A63F 13/85* (2014.01)
  *G06F 3/01* (2006.01)
(52) U.S. Cl.
  CPC ......... *G09B 21/003* (2013.01); *G09B 21/004* (2013.01)

(56) References Cited

U.S. PATENT DOCUMENTS

| | | |
|---|---|---|
| 5,580,251 A | 12/1996 | Gilkes et al. |
| 5,736,978 A | 4/1998 | Hasser et al. |
| 5,766,014 A | 6/1998 | Ida et al. |
| 6,059,575 A | 5/2000 | Murphy |
| 6,230,135 B1 | 5/2001 | Ramsay et al. |
| 6,357,940 B1 | 3/2002 | Murphy |
| 6,639,510 B1 | 10/2003 | Soulie |
| 6,864,877 B2 | 3/2005 | Braun et al. |
| 7,018,209 B2 | 3/2006 | Schleppenbach et al. |
| 7,071,844 B1 | 7/2006 | Moise |
| 7,113,177 B2 | 9/2006 | Franzen |
| 7,226,291 B2 | 6/2007 | Spedden |
| 7,432,912 B2 | 10/2008 | Cote et al. |
| 7,723,896 B2 | 5/2010 | Esashi et al. |
| 8,411,058 B2 | 4/2013 | Wong et al. |
| 8,884,790 B2 | 11/2014 | Page |
| 8,884,901 B2 | 11/2014 | Landau et al. |
| 9,240,129 B1 | 1/2016 | Niemann |
| 9,285,840 B2 | 3/2016 | Kamin-Lyndgaard |
| 9,691,300 B2 | 6/2017 | Wong et al. |
| 2004/0197745 A1 | 10/2004 | Hong et al. |
| 2005/0179565 A1 | 8/2005 | Mase et al. |
| 2008/0138774 A1 | 6/2008 | Ahn et al. |
| 2010/0052950 A1 | 3/2010 | Collier |
| 2012/0050172 A1 | 3/2012 | Wong et al. |
| 2012/0146890 A1 | 6/2012 | Karstens |
| 2012/0240435 A1 | 9/2012 | Meeks |
| 2012/0299853 A1 | 11/2012 | Dagar |
| 2013/0029297 A1 | 1/2013 | Tsai |
| 2014/0132568 A1 | 5/2014 | Hirose et al. |
| 2014/0377721 A1 | 12/2014 | Reid et al. |
| 2014/0377722 A1 | 12/2014 | Reid et al. |
| 2015/0317915 A1 | 11/2015 | Nelson et al. |
| 2016/0018890 A1 | 1/2016 | Deokar et al. |
| 2016/0317919 A1 | 11/2016 | Gassoway et al. |
| 2018/0214771 A1 | 8/2018 | Tran et al. |
| 2018/0214780 A1 | 8/2018 | Tran et al. |

FOREIGN PATENT DOCUMENTS

| | | |
|---|---|---|
| WO | 0221251 A1 | 3/2002 |
| WO | 2004013827 A2 | 2/2004 |
| WO | 2004077379 A2 | 9/2004 |
| WO | 2006014603 A2 | 2/2006 |
| WO | 2007112467 A1 | 10/2007 |
| WO | 2009072993 A1 | 6/2009 |
| WO | 2015083183 A1 | 6/2015 |
| WO | 2016176010 A1 | 11/2016 |

OTHER PUBLICATIONS

Varada, Vijay Raghav, "Refreshable Braille Display", Retrieved on: Aug. 1, 2016 Available at: https://hackaday.io/project/10849-refreshable-braille-display.

Chakraborti, P. et al.; "A Compact Dielectric Elastomer Tubular Actuator for Refreshable Braille Displays"; Elsevier, Sensors and Actuators A 179 151-157; Feb. 2012; 7 Pages.

Ren, Kailiang et al.; "A Compact Electroactive Polymer Actuator Suitable for Refreshable Braille Display"; Elsevier, Sensors and Actuators A 143 335-342 (2008); www.sciencedirect.com; Nov. 2007; 8 Pages.

Basciftci, Fatih et al.; "An Interactive and Multi-functional Refreshable Braille Device for the Visually Impaired"; Elsevier, Displays 41 (2016) 33-41; Nov. 2015.

Bar-Cohen, Yoseph; "Electroactive Polymers for Refreshable Braille Displays"; Pasadena, CA; 2009 SPIE-Newsroom; 3 pages.

"Notice of Allowance Issued in U.S. Appl. No. 15/793,786", dated Jan. 23, 2019, 10 Pages.

"International Search Report and Written Opinion Issued in PCT Application No. PCT/US2018/055764", dated Jan. 23, 2019, 12 Pages.

"International Search Report and Written Opinion Issued in PCT Application No. PCT/US2018/015114", dated Apr. 6, 2018, 13 Pages.

"International Search Report and Written Opinion Issued in PCT Application No. PCT/US2018/015115", dated Apr. 12, 2018, 10 Pages.

"Non Final Office Action Issued in U.S. Appl. No. 15/445,786", dated Nov. 29, 2018, 8 Pages.

Russo, et al., "Creating Video Games for the Visually Impaired", Published on: Apr. 12, 2012 Available at: https://www.wpi.edu/Pubs/E-project/Available/E-project-052312-121436/unrestricted/IQP_MBJ_0007.pdf.

"Vibrations series of products for deafblind", Retrieved From <<https://web.archive.org/web/20120414225033/http:/www.bapsi.org/vibrations-series-of-products-for-deafblind>>, Apr. 14, 2012, 3 pages.

U.S. Appl. No. 15/445,786, Porter, et al., "Braille chording accessory for a game Controller", filed Feb. 28, 2017, 22 Pages.

REFRESHABLE BRAILLE DISPLAY ACCESSORY FOR A GAME CONTROLLER

RELATED APPLICATIONS

This application is a non-provisional of and claims priority to U.S. provisional application Ser. No. 62/453,325, filed Feb. 1, 2017, all of which is incorporated herein by reference in its entirety.

TECHNICAL FIELD

The present disclosure generally relates to a game controller and, more particularly, to a refreshable braille display accessory for a game controller.

BACKGROUND

Electronic gaming is a popular form of entertainment in which a user manipulates an object or a character or otherwise provides input using a game controller. Usually, game controllers include various types of controls that may be configured to be manipulated by a user's fingers to provide various inputs as the game controller is held within the user's hands. A game controller may include push buttons, triggers, touch pads, joysticks, bumpers, directional pads, and the like. A user may engage the various types of controls to provide control signals that map to or actuate different operations within video games.

BRIEF DRAWINGS DESCRIPTION

The present disclosure describes various embodiments that may be understood and fully appreciated in conjunction with the following drawings.

DETAILED DESCRIPTION

Figure 1A:
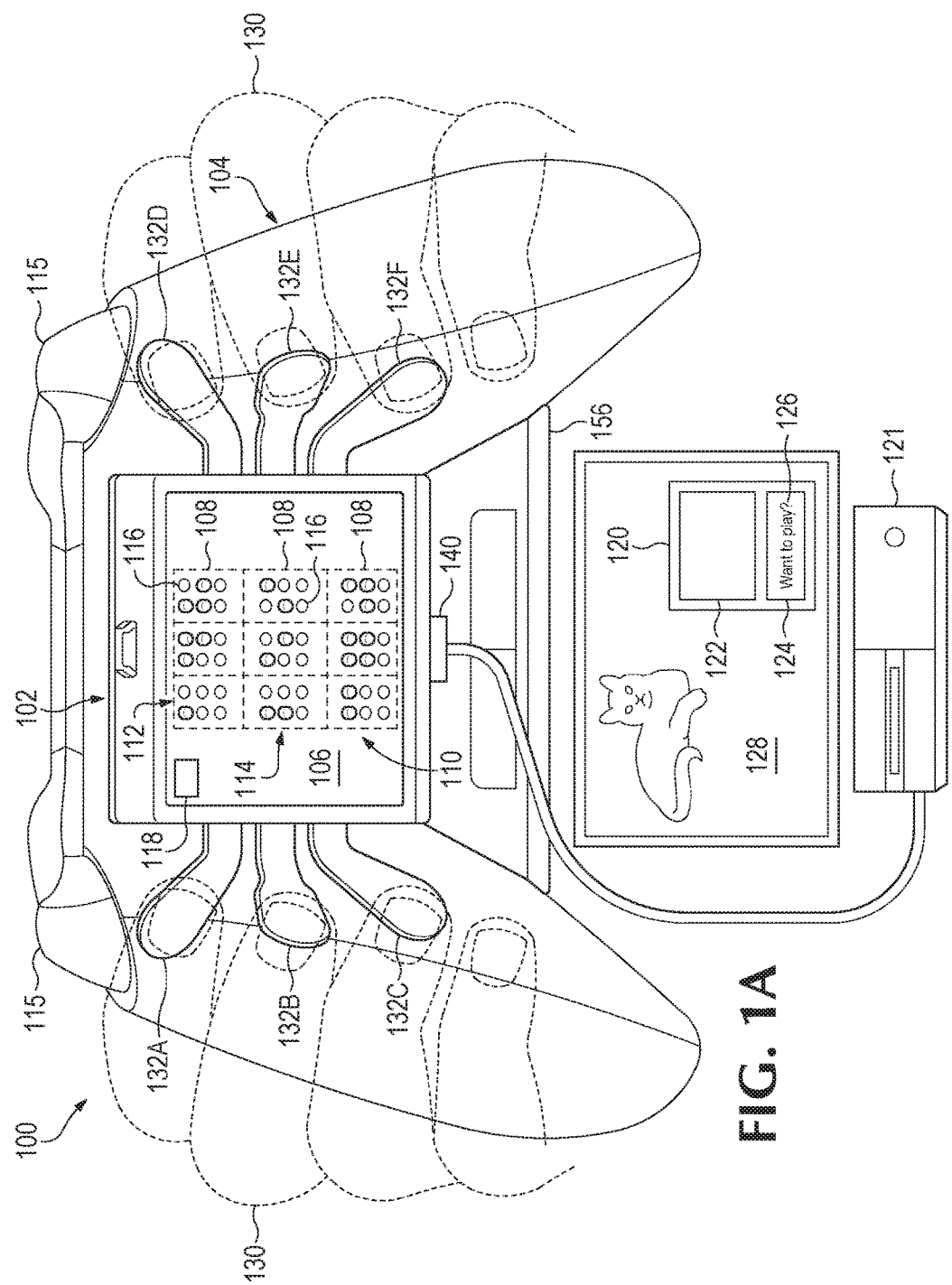
FIG. 1A is a bottom view of an exemplary game controller system with an attached exemplary braille accessory, in accordance with some embodiments.

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

Many game controllers, and the individual controls within them, may be challenging to operate for users that have a physical disability, particularly users that are visually-impaired or blind. Some early games, for example, were text heavy, requiring the user to imagine the virtual world in which the game takes place by reading text, which often made the game inaccessible and excluded visually-impaired or blind users. Some of the greatest game improvements have occurred in the use of complex graphics. Games employing these complex graphics are challenging to use for visually-impaired or blind users since the accompanied audible feedback may only describe the game's complex graphics in a limited manner through the use of screen readers. Although the gaming industry has made some progress towards improving a game's general accessibility, a need remains for improved game controllers and accessories that address the very specialized manner in which visually-impaired or blind users interact with video games.

Figure 1B:
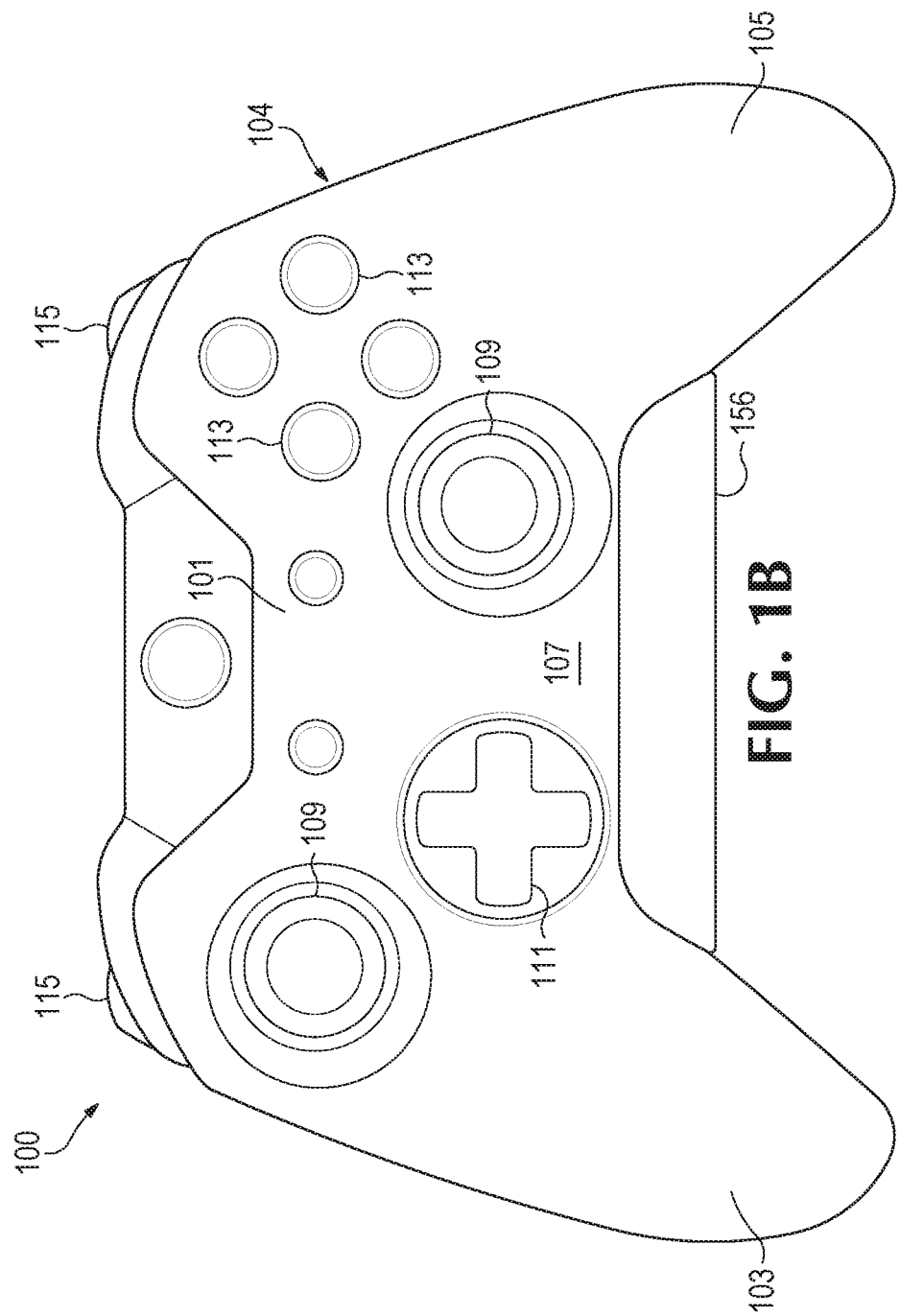
FIG. 1B is a top view of an exemplary game controller system, in accordance with some embodiments.
Figure 1C:
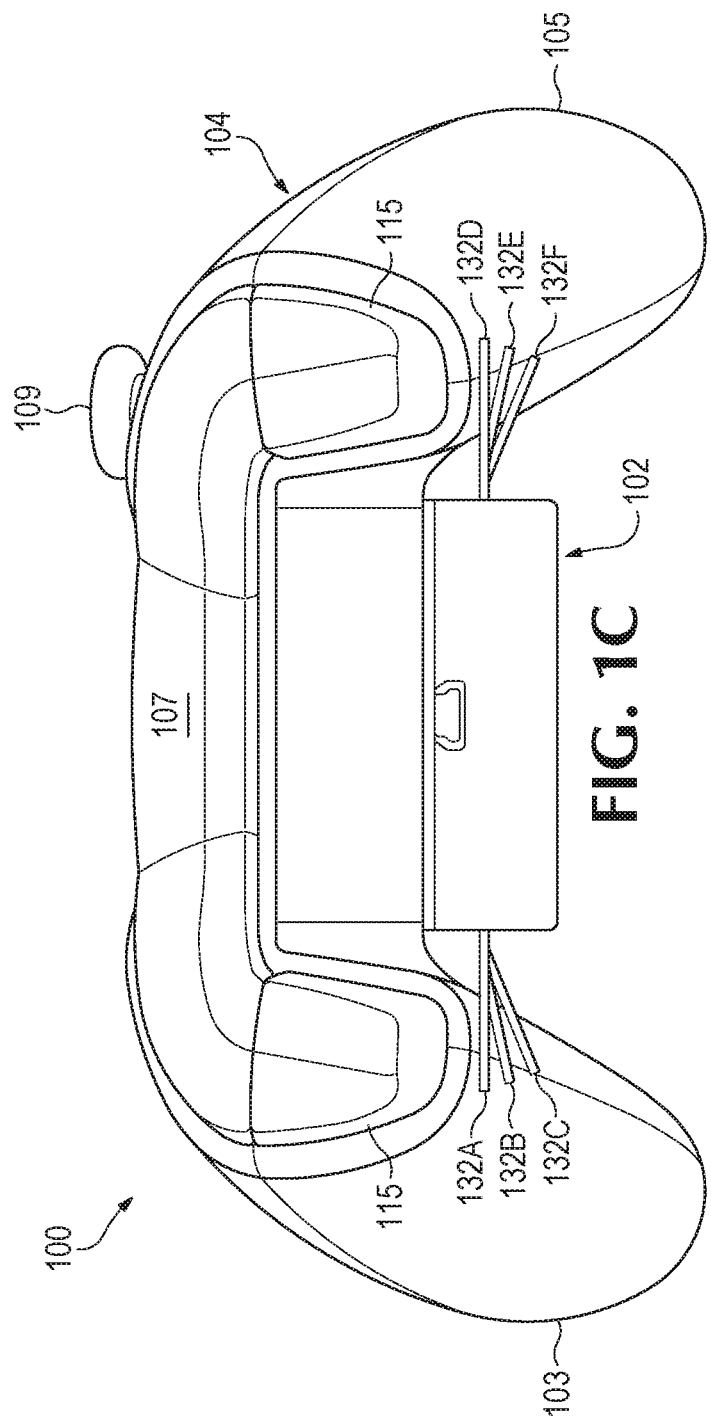
FIG. 1C is a side view of an exemplary game controller system with an exemplary braille accessory, in accordance with some embodiments.
Figure 3A:
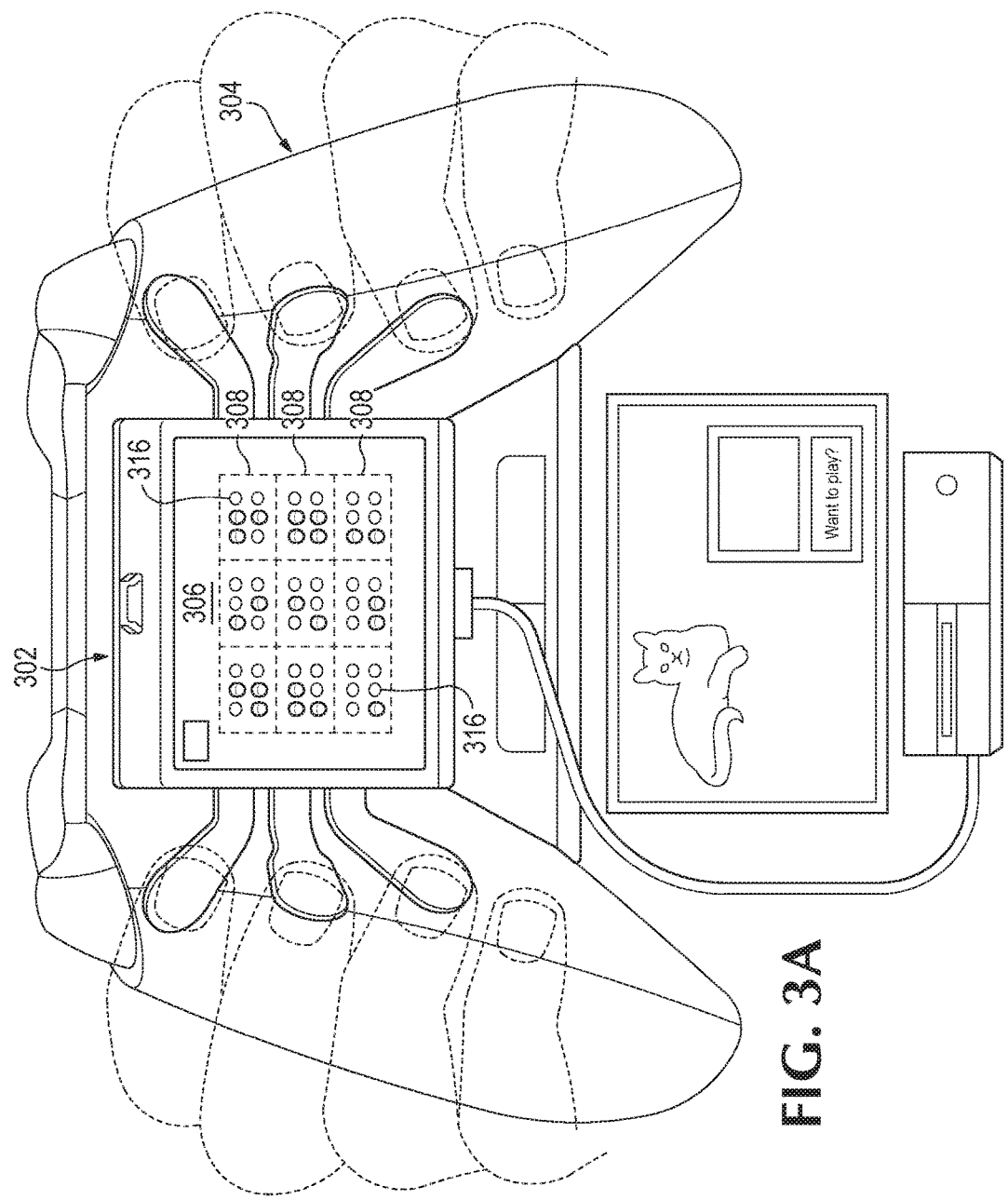
FIG. 3A is a bottom view of an exemplary game controller system with an attached exemplary braille accessory, in accordance with some embodiments.

FIGS. 1A-1C are views of an exemplary game controller system 100, in accordance with some embodiments. FIG. 3A is a bottom view of an exemplary game controller system with an attached exemplary braille accessory, in accordance with some embodiments. Referring to FIGS. 1A-1C and 3A, a game controller system 100 may include a game controller 104 and a braille accessory 102 removably attached to game controller 104. Braille accessory 102 may provide a visually-impaired or blind user with braille input and output gaming capability. Game controller 104 may be sized and shaped to be held by the hands 130 of a user as is well known to a person of ordinary skill in the art. In an embodiment, game controller 104 may be shaped or sized to fit an average hand size of a population of users. Game controller 104 may include controls on a top side for manipulation by a user's thumbs and controls on a bottom side for manipulation by a user's fingers, as the user grips game controller using with two hands. Users may have preferences on the shape, size, position and texture of such thumb-side and finger-side controls that differ from the standard controls that are integral to game controller 104. Moreover, some users may prefer to manipulate controls on just the thumb-side of game controller 104 without having controls located on the finger-side of game controller 104.

Game controller 104 may be configured to translate user input into control signals that are provided to a computing device 121, such as a personal computer or gaming console, as is well known to a person of ordinary skill in the art. Computing device 121 may include a memory device to store instructions and a processing device to execute the instructions stored in the memory device. Computing device 121 may include any type or size of memory and any type of processing device, as is well known to a person of ordinary skill in the art. Computing device 121 may be a personal computer, laptop, tablet, mobile device, gaming console, and the like.

The control signals may be mapped to commands to control a video game or perform other operations to control the video game or computing device 121. In an embodiment, game controller 104 may be configured to transmit control signals to a computing device using any wired or wireless transmission means known to a person of ordinary skill in the art.

Game controller 104 may include a grip 101 configured to be held using two hands 130. As such, grip 101 includes a left-hand portion 103 configured to be gripped by a left hand and a right-hand portion 105 configured to be gripped by a right hand. Right-hand portion 105 may oppose left-hand portion 103. Further, a central portion 107 may be positioned intermediate the left-hand portion 103 and the right-hand portion 105 and may house a plurality of controls, e.g., joysticks 109, directional pad 111, action buttons 113, triggers 115, and the like.

In an embodiment, braille accessory 102 may be sized to be received by handheld-sized game controller 104. Braille accessory 102 may be removably attached to an underside of game controller 104 as shown in FIG. 1A using any attachment means known to a person of ordinary skill in the art e.g., attachment mechanism 156, further developed below.

Braille accessory 102 may include a braille display 106 to output a braille representation of any game text 126 or any game audio occurring during the course of game play (and displayed on output section 122 of game display 128) to make game text 126 accessible to visually-impaired or blind users. In an embodiment, game text 126 may include text that is displayed in a game chat window or box 120 in which gaming participants can engage in live discussion with one another. Game chat window 120 allows a user to see messages he or she has received, as well as messages that he or she has sent. Game chat window 120 may have any of a variety of designs.

Game chat window 120 may include a larger output section 122 on top of a smaller input section 124. Output section 122 may show messages that the user may have already sent or messages that the user may have received from other players. Input section 124 may display messages created by the user in real time that have not yet been sent. Online video games, especially massively multiplayer online (MMO) games often include chat windows or boxes 120 for communication between players. Chat windows or boxes 120 may be customizable in size, color, location, and the like and may be changed to receive only messages from certain players or include multiple tabs to provide different information in discrete layers of a single window display 128. In some circumstances, any kind of game audio may also be translated to braille for output to braille display 106.

Braille accessory 102 may receive game text 126 or game audio using any wired or wireless transmission means known to a person of ordinary skill in the art. In an embodiment, braille accessory 102 may receive game text 126 using a wired cable 140 connected between braille accessory 102 and computing device 121 executing the game, e.g., a personal computer or gaming console. In another embodiment, braille accessory 102 may receive game text 126 using any wireless means known to a person of ordinary skill in the art, e.g., a wireless circuit or receiver (not shown). In yet another embodiment, braille accessory 102 may receive game text 126 from game controller 104 through a wired or wireless connection between braille accessory 102 and game controller 104. Game controller 104 may receive game text 126 from computing device 121 executing the game through any wired or wireless means known to a person of ordinary skill in the art, e.g., cables, wireless receivers, and the like. Game controller 104, in turn, may transmit game text 126 to braille accessory 102 for translation from text to braille, for output on braille display 106. In an embodiment, translation of game text 126 to braille may occur at braille accessory 102 (e.g., using control circuit 165). In other embodiments, translation of game text 126 to braille may occur at game controller 104, with the results transmitted to the braille accessory 102 for output on braille display 106.

Figure 4:
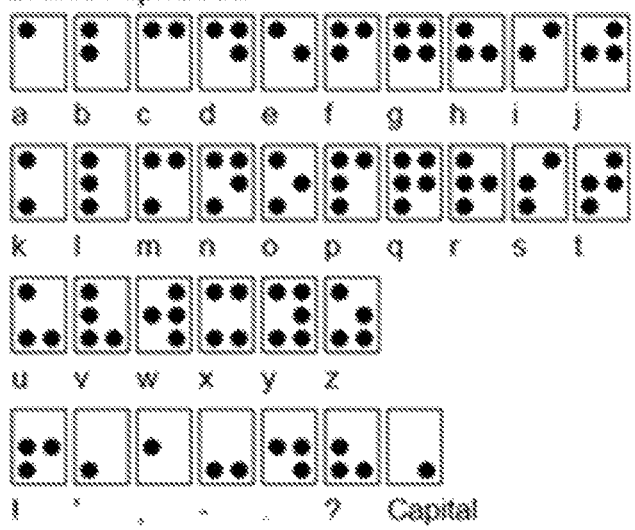
FIG. 4 illustrates an exemplary Braille alphabet.

Braille display 106 may include a plurality of braille cells 108 arranged in an array 110 having a plurality of columns 112 and rows 114. Although FIG. 1A shows array 110 having three columns 112 and three rows 114, a person of ordinary skill in the art should recognize that any number of braille cells 108 arranged in any number of columns 112 or rows 114 comes within the scope of the disclosure. Each braille cell 108 includes six pins or dots 116 arranged in two columns and three rows that can be read tactually with the fingers of visually-impaired or blind users. Each braille cell 108 may represent a single letter, number, punctuation, or other character using braille coding as is well known to a person of ordinary skill in the art. FIG. 4 illustrates an exemplary braille alphabet.

In an embodiment shown in FIG. 3A, braille cell 308 may be rotated by ninety degrees such that six pins or dots 316 are arranged in three columns and two rows (i.e., three pins or dots arranged horizontally and two pins 316 or dots 316 arranged vertically). By doing so, a "line" of text may be formed not by horizontally-adjacent cells, but by vertically-adjacent cells to account for the user's finger position on braille accessory 302 on the back of controller 304. Put differently, rotating braille cell 308 by ninety degrees allows for a user's finger position as it wraps around from front to back of controller 304 to more naturally read a line of text on braille display 306.

To read braille display 106, a visually-impaired or blind user may run his or her fingers, e.g., index, middle, ring, or pinky fingers, on hands 130 through the braille cells 108 to tactually detect raised pins or dots 116 as is well known to a person of ordinary skill in the art. In an embodiment, a visually-impaired or blind user may read braille display 106 vertically from top to bottom and left to right such that the first character is represented in braille cell 108 located in the first column 112 first row 114, the second character is represented in braille cell 108 located in the first column 112 second row 114, the third character is represented in braille cell 108 located in the first column 112 third row 114, the fourth character is represented in braille cell 108 located in the second column 112 first row 114, the fifth character is represented in braille cell 108 located in the second column 112 second row 114, and so on.

Braille display 106 may further include scroll actuator 118 to scroll game text 126. Scroll actuator 118 may include any actuating means known to a person of ordinary skill in the art, including any electronic or mechanical actuating means, e.g., switch, push button, touch activated electronic switch, and so on. Because braille display 106 has a predetermined number of braille cells 108 that may represent a predetermined number of characters in game text 126 or game audio, it may be necessary for a visually-impaired or blind user to actuate or otherwise indicate to braille accessory 102 that it is ready to receive a new batch of characters from game text 126 by actuating scroll actuator 118 after reading the current batch of characters displayed or output on braille display 106. A visually-impaired or blind user may program or set braille accessory 102 to scroll a single column 112 or row 114 or multiple columns 112 or rows 114 of new characters per each actuation of scroll actuator 118. Conversely, a visually-impaired or blind user may program or set braille accessory 102 to scroll all new characters per each actuation of scroll actuator 118. In an embodiment, scroll actuator 118 may scroll the translation of game text 126 or game audio one character at a time in a vertical direction, with an oldest character represented by a top left braille cell being scrolled off braille display 106 and with a newest character to be represented by a bottom right braille cell being scrolled on to the braille display 106.

Braille accessory 102 may include six braille paddles 132A-F to allow a visually-impaired or blind user to input or chord braille characters during the course of game play to send to other players. Braille paddles 132A-F may be shaped or curved to follow a contour game controller 104 as game controller 104 is gripped by hands 130.

In an embodiment, braille accessory 102 may translate the chorded braille characters to text 126 that is shown on input section 124 of game display 128 after transmission from braille accessory 102 to computing device 121 or game controller 104. In other embodiments, braille accessory 102 may transmit chorded braille to game controller 104 for translation to game text 126. Braille paddles 132A-F may be located on a finger-side of game controller 104, three braille paddles 132A-C on a right side and three braille paddles 132D-F on a left side of game controller 104, when game controller 104 is gripped thumb-side up by hands 130 of a visually-impaired or blind user. Braille paddles 132A-F may be manipulated by fingers other than the thumbs, e.g., index, middle, ring, or pinky fingers, of a user gripping game controller 104 with both hands 130. Control circuit 165 on braille accessory 102 may translate a touch force applied to any of braille paddles 132A-F into an individual braille character.

In an embodiment, braille paddles 132A-F may be actuated by a touch force from fingers on hands 130 to generate signals that are mapped or translated from braille to text 126 or game audio. The text 126 or game audio is then transmitted from braille accessory 102 to computing device 121 or from braille accessory 102 to game controller 104 to computing device 121 for display on input section 124 before being displayed on output section 122 of chat window 120 after being sent. Such a configuration would allow a visually-impaired or blind user to communicate with other players in real time.

The chording of braille on braille paddles 132A-F is well known to a person of ordinary skill in the art and may follow any number of braille coding schemes, such as the 6-dot scheme shown in FIG. 4. A person of ordinary skill in the art should recognize that other braille coding schemes exist that come within the scope of the disclosure, e.g., 8-dot braille coding schemes.

Braille accessory 102 may transmit the braille chords input by a visually-impaired or blind user using braille paddles 132A-F to computing device 121 or game controller 104 using any wired or wireless transmission means known to a person of ordinary skill in the art, e.g., cable 140, wireless circuit or receiver (not shown), and the like. Each of braille paddles 132A-F may be shaped for actuation by a user's fingers other than the thumb, as the user grips game controller 104 using both hands and as braille accessory 102 is received on an underside of game controller 104.

In an embodiment, braille paddles 132A-F may be removably affixed or attached to braille accessory 102 or game controller 104 via any attachment mechanism known to a person of ordinary skill in the art, e.g., screws or other fasteners. In an embodiment, braille paddles 132A-F may be attached to braille accessory 102 or game controller 104 using pivots as described in U.S. patent application 2016/0317919 to Gassoway, et al., entitled Paddle Accessory For A Game Controller, which is included herein by reference. Moreover, game controller 104 may enable braille paddles 132A-F to be quickly and easily swapped on braille accessory 102 or game controller 104 without the use of tools. Such a configuration may facilitate the use of differently sized or oriented braille paddles 132A-F for a customizable game controller 104 and/or braille accessory 102.

Referring to FIGS. 1B and 1C, game controller 104 may include a plurality of controls located on a top or thumb-side. These controls may be configured to be manually manipulated by right and/or left thumbs of a user gripping the game controller with two hands 130 during gameplay. In some embodiments, a user may manipulate one or more of the plurality of controls with an index finger. The plurality of controls may include joysticks 109, directional pad 111, action buttons 113, triggers 115, and so on as is well known to a person of ordinary skill in the art. Game controller 104 may include any suitable number and type of controls.

Figure 1D:
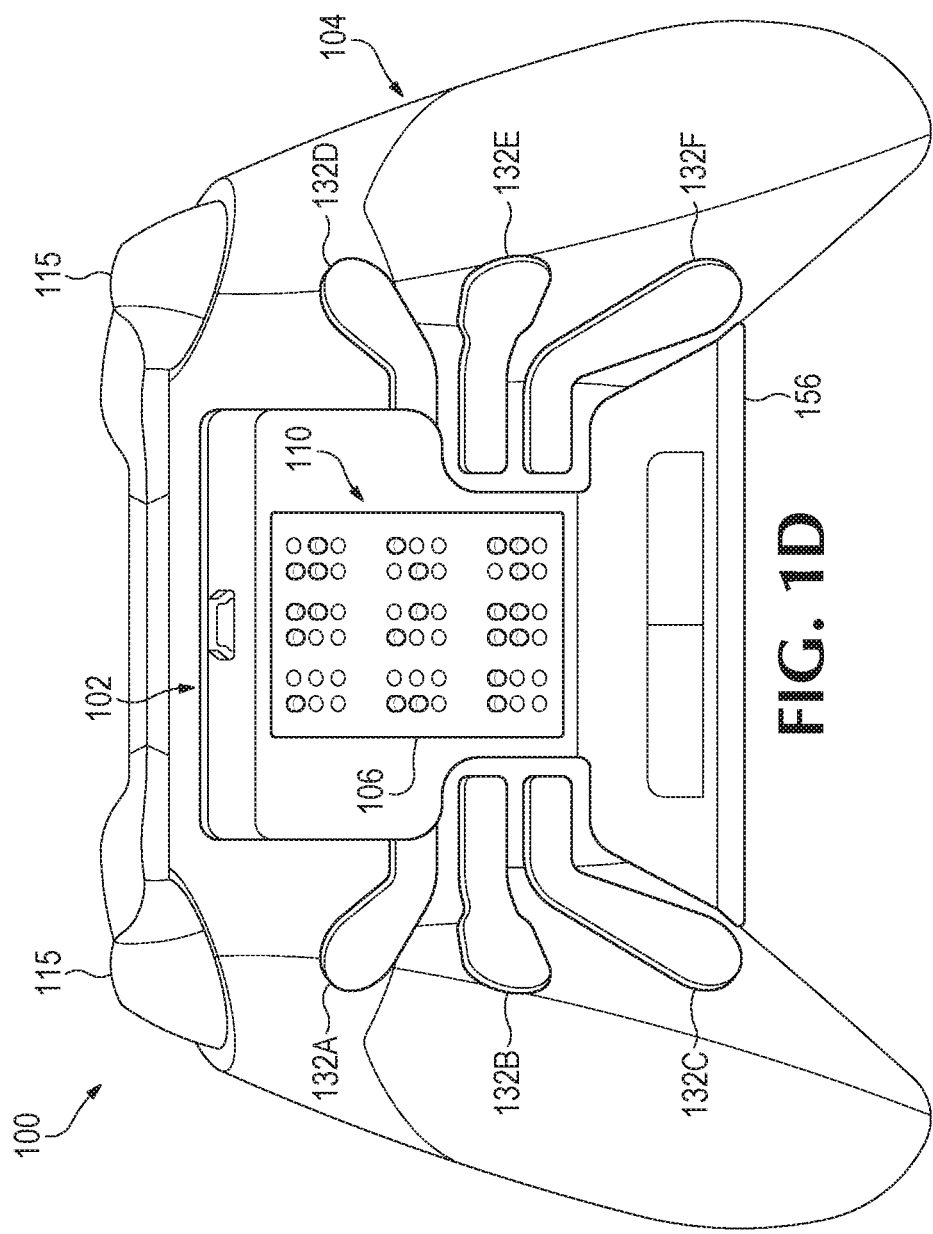
FIG. 1D is a bottom view of an exemplary game controller system with an attached exemplary braille accessory, in accordance with some embodiments.

FIG. 1D is a bottom view of an exemplary game controller system with an attached exemplary braille accessory, in accordance with some embodiments. Referring to FIGS. 1A-1D, braille accessory 102 may include two removably attached braille paddles 132A and 132D that are coupled to operate with four braille paddles 132B, 132C, 132E, and 132F removably attached to game controller 104. In an embodiment in which braille accessory 102 is removably attached to game controller 104, braille accessory 102 may receive control signals from all six braille paddles 132A-F that braille accessory 102 then translates from braille to text and transmits to computing device 121 for display as text 126 on input section 124. In an embodiment in which four braille paddles 132B, 132C, 132E, and 132F are removably attached to game controller 104, braille accessory 102 may receive controls signals for braille paddles 132B, 132C, 132E, and 132F from game controller 104 that braille accessory 102 then synchronizes or otherwise couples to controls signals from braille paddles 132A and 132D, before translating the braille chording representative of all six braille paddles 132A-F to text 126.

In another embodiment, game controller 104 may receive control signals from all six braille paddles 132A-F, including braille paddles 132A and 132D attached to braille accessory 102, that game controller 104 then translates from braille to text and transmits to computing device 121 for display as text 126 on input section 124.

Figure 1E:
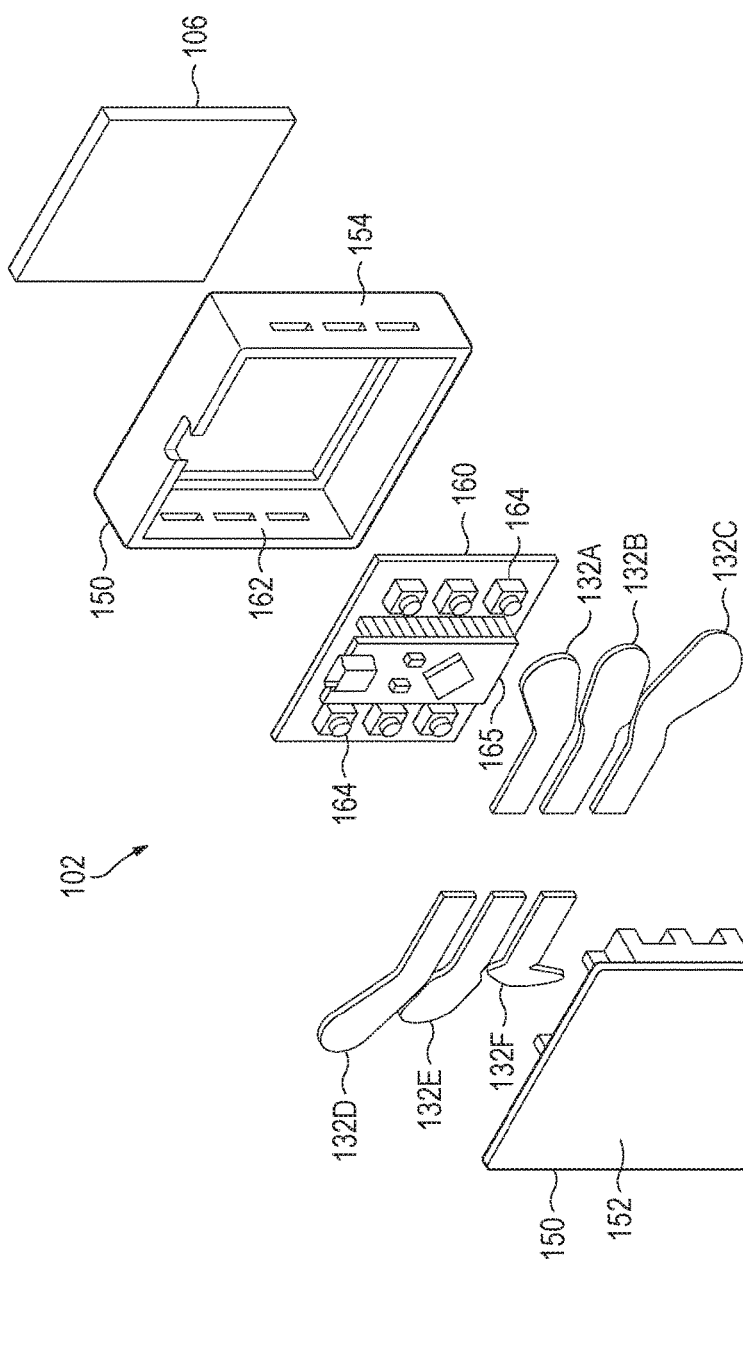
FIG. 1E is an exploded view of an exemplary braille accessory, in accordance with some embodiments.

FIG. 1E is an exploded view of an exemplary braille accessory, in accordance with some embodiments. Referring to FIGS. 1A-1E, braille accessory 102 may include a housing 150 to enclose electronic circuits and mechanisms that control operation of braille display 106 and/or braille paddles 132A-F. Housing 150 may include a first housing portion 152 and a second housing portion 154 that removably attaches to first housing portion 152 using any removable fastening mechanism known to a person of ordinary skill in the art, e.g., screws, built in snaps, and the like. First housing portion 152 may attach to second housing portion 154 using snap features designed into first housing portion 152 and/or second housing portion 154, when first housing portion 152 and second housing portion are made of molded plastic. Housing 150 may be made of any material known to a person of ordinary skill in the art, e.g., plastic, metal, and the like.

First housing portion 152 may include an attachment mechanism 156 to removably attach braille accessory 102 to game controller 104. In an embodiment, attachment mechanism 156 may be a substantially u-shaped clamp that extends from an end of first housing portion 152 and removably attaches to central portion 107 of game controller 104. In an embodiment, attachment mechanism 156 may removably attach game controller 104 using any removably attachment means known to a person of ordinary skill in the art, e.g., fasteners, snap features built into housing 150, and/or game controller 104.

A printed circuit assembly 160 may be located in an interior cavity 162 of housing 150. Printed circuit assembly 160 may include a plurality of electronic circuits 165 to control operation of braille display 106 and/or braille paddles 132A-F. In an embodiment, printed circuit assembly 160 may include a plurality of actuation sensors 164 that corresponds to braille paddles 132A-F. Each of braille paddles 132A-F may be configured to activate a corresponding actuation sensor 164 in response to a force touch to generate a control signal responsive to being depressed (e.g., via finger manipulation). In an embodiment, control circuit 165 may detect actuation of sensors 164 to translate the touch force applied to the at least one of paddles 132A-F into individual braille characters.

In some embodiments, printed circuit board 160 may include other sensors that correspond to the plurality of input controls, e.g., joysticks 109, directional pad 111, action buttons 113, or triggers 115.

The plurality of actuation sensors 164 may be any type of sensor or switch known to a person of ordinary skill in the art capable of detecting actuation or manipulation of braille paddles 132A-F, e.g., dome switches, tactile switches, buttons, levers, dials, rockers, Hall Effect sensors, and other electronic sensing components. Printed circuit assembly 160 may include any number or type of actuation sensors 164.

Printed circuit assembly 160 may include a processing device and a memory device as part of electronic circuits 165 to control operation of braille display 106 and/or braille paddles 132A-F.

Figure 2A:
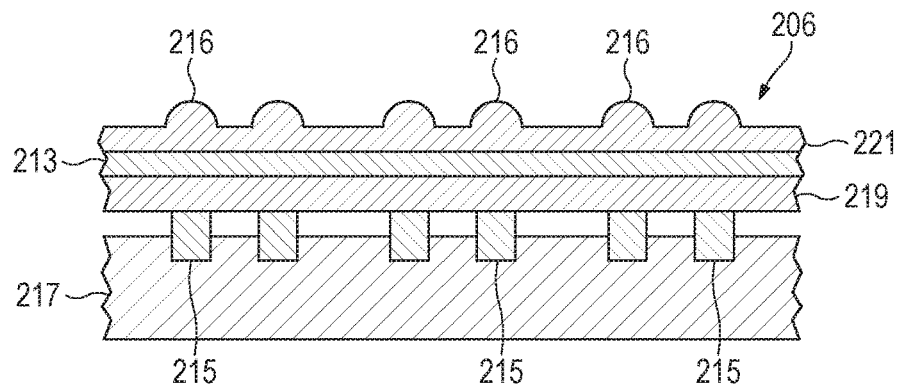
FIG. 2A is a side view of an exemplary braille display, in accordance with some embodiments.
Figure 2B:
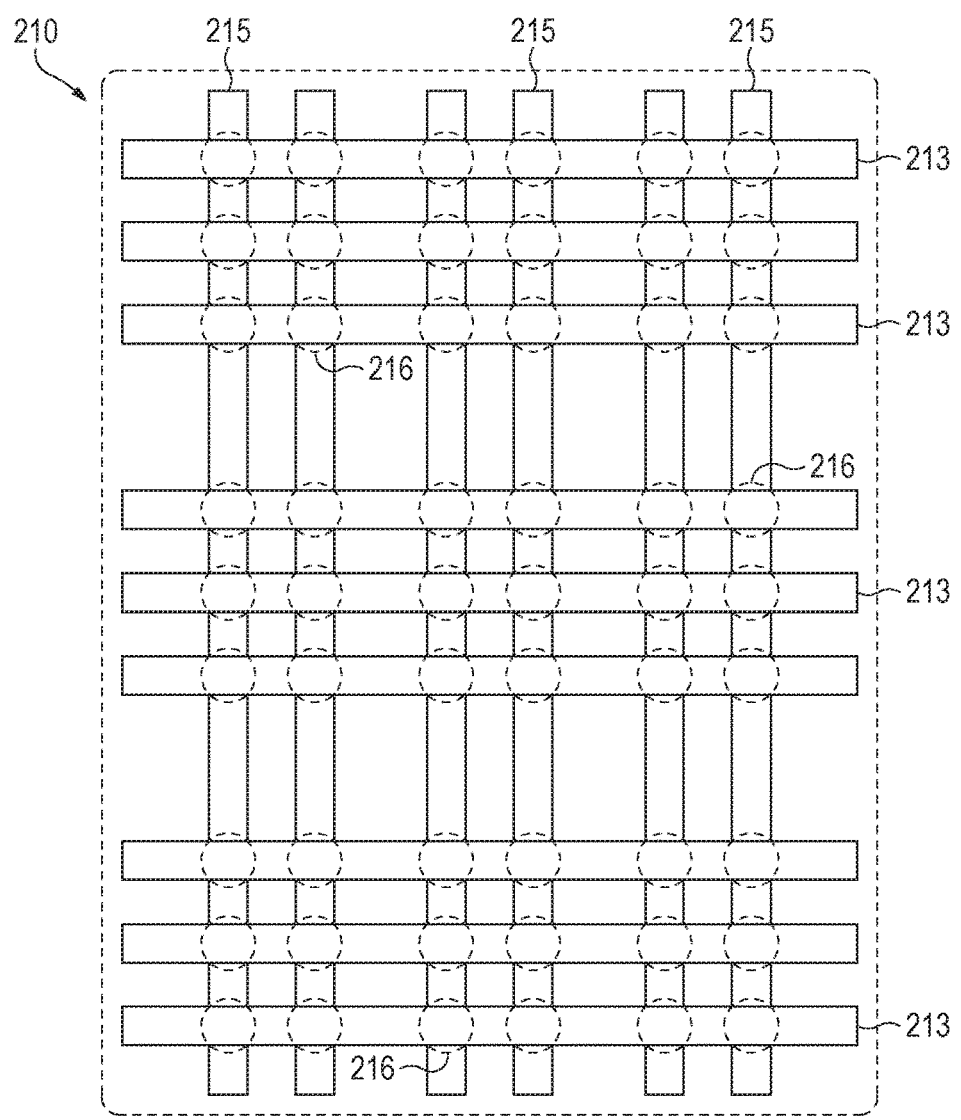
FIG. 2B is a top view of a column and row electrode arrangement for driving an exemplary braille display, in accordance with some embodiments.

FIG. 2A is a side view of an exemplary braille display 206, in accordance with some embodiments and FIG. 2B is a top view of a column and row electrode arrangement for driving an exemplary braille display 206, in accordance with some embodiments. Referring to FIGS. 1A-1E, 2A, and 2B, braille display 106 or 206 may have any construction, design, and be made of any materials known to a person of ordinary skill in the art. Refreshable braille display 106 or 206 may raise and lower a large array 110 of pins or dots 116 arranged in a closely spaced arrangement, allowing quick tactile perception for rapid reading. Refreshable braille display 106 or 206 may raise or lower pins or dots 116 to approximately 0.5 mm with an actuation force of at least 0.15N. Refreshable braille display 106 or 206 may employ pins or dots 116 using any actuating means known to a person of ordinary skill in the art, e.g., electro-active polymers (EAP) materials, electromagnetic means, piezo-electric means, thermal means, pneumatic means, shape memory alloys, and the like.

In an embodiment, braille display 106 or 206 may include the use of EAP materials that may aid in footprint reduction such that the braille accessory 102 is sized to be received by handheld game controller 104. One benefit of EAP materials is the ability to pack a large array 110 of dots or pins 116 in a relatively small area without interference between dots or pin 116.

Braille display 206 may include an array 210 of dots or pins 216 made of any shape, size, or material to fit the application that is known to a person of ordinary skill in the art. Dots or pins 216 may be mounted on a film 221 made of any material known to a person of ordinary skill, e.g., rubber, silicone, plastic, and the like. Rows of electrodes 213 and columns of electrodes 215 may be arranged on either side of an EAP film 219 to activate individual elements in EAP film 219. Electrodes 213 and 215 may be formed of any conductive material known to a person of ordinary skill in the art, e.g., metals. In an embodiment, electrodes 213 and 215 may be formed on a substrate 217 using known semiconductor and other manufacturing techniques, e.g., screen printing, deposition and patterning techniques, and the like.

Each element in EAP film 219 is mounted with a corresponding dot or pin 216 in array 210. Each element in EAP film 219 is deactivated or lowered from a top surface of braille display 206 by applying a voltage across a thickness of EAP film 219 that, in turn, may cause a local thickness reduction in EAP film 219. Although requiring a high actuation voltage, EAP film 219 may consume very little power and require no power to keep an actuator at a given position.

Braille accessory 102 may activate dots or pins 216 to create tactile patterns or highs and lows representative of text 126 to be read by a visually-impaired or blind user. In an embodiment, a visually-impaired or blind user may use his fingertips to scan dots or pins 216 to read text 126, while freeing his thumbs to manage control of gameplay. Each of the plurality of pins 216 may include a corresponding electroactive polymer in EAP film 219. A control circuit 165 included in printed circuit assembly 160 may deliver a current or voltage to the electroactive polymer to actuate the pin 216 to an active state based at least in part on the translation of the game text 126 or the game audio to the individual braille characters EAP film 219 may be made of any EAP-type material, ionic or field-activated, known to a person of ordinary skill in the art, e.g., conductive polymers, dielectric elastomers, ferroelectric materials, ionic polymer metal composites, and polyvinylidene difluoride materials. EAP film 219 may be activated using electrostatic forces between two electrodes that squeeze or compress the polymer. For ionic EAP film 219, actuation is caused by the displacement of ions inside the polymer. Only a few volts are needed for actuation, but the ionic flow implies a higher electrical power needed for actuation, and energy is needed to keep the actuator at a given position. Examples of ionic EAP film 219 are conductive polymers, ionic polymer-metal composites (IPMCs), and responsive gels.

Persons of ordinary skill in the art will appreciate that the present disclosure is not limited to what has been particularly shown and described hereinabove. Rather, the scope of the present disclosure includes both combinations and subcombinations of the various features described hereinabove as well as modifications and variations which would occur to such skilled persons upon reading the foregoing description. Only the claims define the scope of the disclosure.

The invention claimed is:

1. A braille display, comprising:
    a housing sized to be received by a handheld game controller;
    a plurality of pins arranged as a plurality of braille cells, each of the plurality of braille cells including six pins arranged in two columns and three rows; and
    a control circuit to control refreshable actuation of the plurality of pins to provide tactile feedback to a finger based at least in part on a translation of game text or game audio to individual braille characters represented on each of the plurality of braille cells.

2. The braille display of claim 1, wherein the housing includes an attachment mechanism to removably attach the housing to the handheld game controller.

3. The braille display of claim 1,
    wherein the plurality of pins are arranged over an electroactive polymer film; and wherein each of the plurality of pins protrudes above a top end of the housing in an active state to provide the tactile feedback to the finger based at least in part on the translation of the game text or game audio to the individual braille characters represented on each of the plurality of braille cells.

4. The braille display of claim 3,
wherein each pin of the plurality of pins includes an electroactive polymer; and
wherein the control circuit delivers a current to the electroactive polymer to actuate the pin to the active state based at least in part on the translation of the game text or the game audio to the individual braille characters.

5. The braille display of claim 1, wherein the plurality of braille cells are vertically arranged from top to bottom and from left to right.

6. The braille display of claim 1, further comprising:
a scroll actuator to scroll the translation of the game text or the game audio to the individual braille characters one character at a time.

7. The braille display of claim 6, wherein the scroll actuator scrolls the translation of the game text or the game audio one character at a time in a vertical direction, with an oldest character represented by a top left braille cell being scrolled off the braille display and with a newest character to be represented by a bottom right braille cell being scrolled on to the braille display.

8. A game controller accessory, comprising:
a handheld housing including a braille display configured to be removably attached to a handheld game controller;
a plurality of pins arranged on the braille display as a plurality of braille cells, each braille cell having six pins arranged in two columns and three rows;
a control circuit to control refreshable actuation of the plurality of pins to represent individual braille characters on each of the plurality of braille cells based at least in part on a translation of game text or game audio.

9. The game controller accessory of claim 8,
wherein the handheld housing includes an attachment mechanism to removably attach the handheld housing to the handheld game controller.

10. The game controller accessory of claim 9, wherein the attachment mechanism at least partially surrounds a body of the handheld game controller when removably attached to the handheld game controller.

11. The game controller accessory of claim 8,
wherein the plurality of pins are arranged over an electroactive polymer film; and
wherein each of the plurality of pins protrudes above a top end of the housing in an active state to provide tactile feedback to a finger based at least in part on the translation of the game text or game audio to the individual braille characters represented on each of the plurality of braille cells.

12. The game controller accessory of claim 11,
wherein each pin of the plurality of pins includes an electroactive polymer; and
wherein the control circuit delivers a current to the electroactive polymer to actuate the pin to the active state based at least in part on the translation of the game text or the game audio to the individual braille characters.

13. The game controller accessory of claim 8,
wherein the plurality of braille cells are vertically arranged from top to bottom and from left to right.

14. The game controller accessory of claim 8, further comprising:
a scroll actuator to scroll the translation of the game text or the game audio to the individual braille characters one character at a time.

15. The game controller accessory of claim 14,
wherein the scroll actuator scrolls the translation of the game text or the game audio one character at a time in a vertical direction, with an oldest character represented by a top left braille cell being scrolled off the braille display while a newest character being scrolled on to the braille display to be represented by a bottom right braille cell.

16. The game controller accessory of claim 8, wherein the control circuit receives the translation of the game text or the game audio.

17. An apparatus, comprising:
a housing sized to be received by a handheld game controller;
a braille display including a plurality of pins arranged in a plurality of braille cells, each of the plurality of braille cells to provide tactile feedback representative of individual braille characters; and
a control circuit enclosed within the housing to control refreshable activation of at least a portion of the plurality of pins based at least in part on a translation of game text or game audio.

18. The apparatus of claim 17, wherein the housing includes an attachment mechanism to removably attach the housing to an underside of the handheld game controller.

19. The apparatus of claim 17,
wherein the plurality of pins are arranged over an electroactive polymer film; and
wherein each of the plurality of pins protrudes above a top end of the housing in an active state to provide the tactile feedback to a finger based at least in part on the translation of the game text or game audio to the individual braille characters represented on each of the plurality of braille cells.

20. The apparatus of claim 19,
wherein each pin of the plurality of pins includes a corresponding electroactive polymer in an electroactive film; and
wherein the control circuit delivers a current or voltage to the electroactive polymer to actuate the pin to the active state based at least in part on the translation of the game text or the game audio to the individual braille characters.

* * * * *